United States Patent [19]

Nagase

[11] 4,071,057
[45] Jan. 31, 1978

[54] METHOD FOR FILLING GAS INTO SEALED CYLINDER DEVICE

[75] Inventor: Toshiro Nagase, Sagamihara, Japan
[73] Assignee: Tokico Ltd., Japan
[21] Appl. No.: 704,615
[22] Filed: July 12, 1976
[30] Foreign Application Priority Data

July 21, 1975 Japan .................................. 50-88999

[51] Int. Cl.² .............................................. B65B 3/04
[52] U.S. Cl. ...................................... 141/4; 188/269;
188/322; 188/352; 267/64 R
[58] Field of Search .................. 141/1, 4, 5, 9, 25–28,
141/46, 100, 326; 188/322, 352, 269; 267/64 R, 65

[56] References Cited
U.S. PATENT DOCUMENTS 3,827,539   8/1974   Fader et al. ........................... 188/322

Primary Examiner—Houston S. Bell, Jr.
Attorney, Agent, or Firm—Wenderoth, Lind & Ponack

[57] ABSTRACT

A method for filling gas into a sealed cylinder device having a rod guide closing one end thereof and guiding a rod slidably therethrough comprising the steps of forming the rod guide to have a cavity consisting of a cylindrical portion to retain a seal therein and an inwardly divergent portion continuous with the cylindrical portion, displacing the seal inwardly so as to form an annular gap between the outer periphery of the seal and the wall of the divergent cavity portion, filling gas into the cylinder device through the annular gap, and displacing the rod outwardly to carry the seal therewith so as to displace the seal into the cylindrical cavity portion, whereby the seal is thereafter retained in its position due to gas pressure in the cylinder.

6 Claims, 4 Drawing Figures

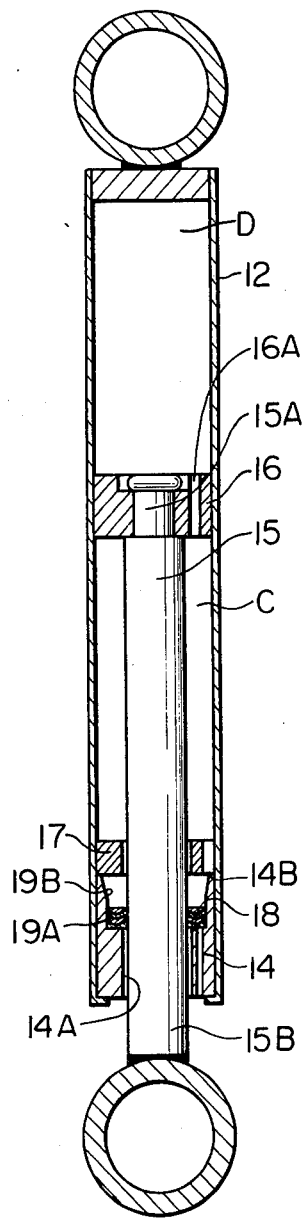
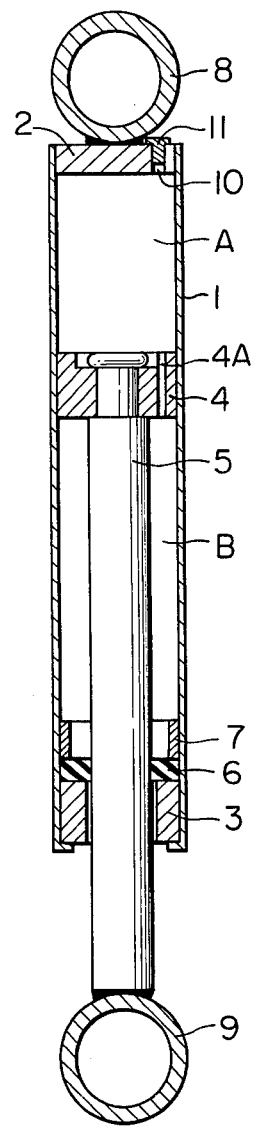

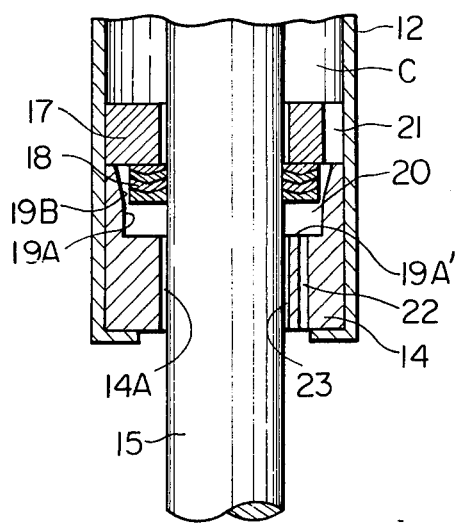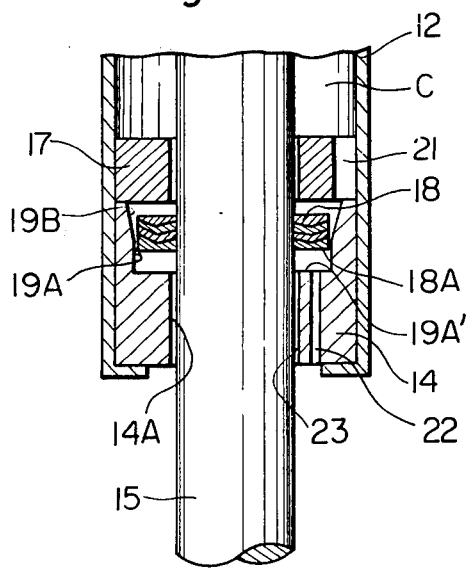

METHOD FOR FILLING GAS INTO SEALED CYLINDER DEVICE

BACKGROUND OF THE INVENTION

This invention relates to a method for filling gas into a sealed cylinder device having a telescopically movable rod, such as a gas spring or a hydropneumatic shock absorber or the like.

In one prior art gas spring arrangement, one end of a cylinder is closed by a cover plate sealingly secured thereto by welding. A piston is fitted slidably in the cylinder, and a rod secured to the piston extends outside of the cylinder sealingly through a rod guide secured to the other end of the cylinder. The interior of the cylinder is filled with oil and compressed gas (usually, nitrogen). For filling the compressed gas into cylinder, an opening is formed in the cover plate and the gas spring is located in an atmosphere of gas under a predetermined pressure thereby allowing gas to flow into the cylinder. Thereafter a plug is sealingly fitted in the opening and secured to the cover plate such as by welding in the atmosphere.

In in case, difficulties are encountered such that the system for enclosing at least a portion of the gas spring within the atmosphere and performing the welding operation is expensive, and inspection for finding gas leakage during the welding operation is difficult since the welding is performed in the gas atmosphere.

SUMMARY OF THE INVENTION

The object of the present invention is to solve the aforementioned difficulties by providing a method which is high in reliability and simple in filling gas into a cylinder. According to the present invention there is provided a method for filling gas into a cylinder device including a rod guide sealingly closing one end of the cylinder and allowing sliding movement of a rod, the method comprising the steps of forming the rod guide to have a cavity consisting of a cylindrical portion to retain a seal therein and an inwardly divergent portion continuous with the cylindrical portion, moving the seal inwardly so as to form an annular gap between the outer periphery of the seal and the wall of the inwardly divergent cavity portion, filling gas under pressure into the cylinder through the annular gap, and displacing the rod outwardly to carry the seal therewith so that the seal is moved into the cylindrical cavity portion to close the annular gap, whereby the seal is retained in its position thereafter due to pressure in the cylinder.

BRIEF DESCRIPTION OF THE DRAWINGS

The present invention will now be further described in connection with the accompanying drawings, in which:

FIG. 1 is a cross-sectional view of a typical gas spring of the prior art;

FIG. 2 is a cross-sectional view showing one embodiment of a sealed type cylinder device formed according to the present invention;

FIG. 3 is a enlarged cross-sectional view of an essential part of the cylinder device of FIG. 2 illustrating the condition of the gas being filled through an annular gap; and FIG. 4 is a view similar to FIG. 3 but showing the annular gap being closed.

DETAILED DESCRIPTION OF THE INVENTION

In FIG. 1 showing a prior art gas spring, one end of a cylinder 1 is closed by a cover plate 2, and a rod guide 3 is retained on the other end of the cylinder 1. A piston 4 fitted slidingly within the cylinder 1 divides the interior thereof into chambers A and B, and a rod 5 secured to the piston 4 extends through the chamber B and the rod guide 3. The chambers A and B are filled with oil and gas under pressure, while the fluid communicates between the chambers A and B through a restricted passage 4A. A seal 6 is interposed between the inner surface of the cylinder 1 and the outer surface of the rod 5 to prevent oil or gas leakage therethrough, and a stopper 7 acts to restrict the outward movement of the piston and the rod relative to the cylinder 1.

An opening 10 is formed in the cover plate 2 for filling gas into the cylinder and a plug 11 is sealingly fitted in the opening 10. Upon filling gas into the gas spring of the aforesaid arrangement, the gas spring is located in the atmosphere of gas under pressure with a gap left between the opening 10 and the plug 11, thereby allowing gas to enter the cylinder 1. Thereafter, the plug 11 is sealingly fitted in the opening 10 within the gas atmosphere such as by welding. Thus, a system for performing such operation becomes a large scaled one and expensive since the system is required to sealingly enclose at least the upper portion of the gas spring and to perform gas filling and welding operations under high pressure. Further, difficulty is encountered with the inspection of welding.

An embodiment of a cylinder device fabricated according to the present invention is shown in FIG. 2, and FIGS. 3 and 4 are enlarged cross-sectional views illustrating essential parts of the device of FIG. 2 in different stages of the gas filling operation.

A rod guide 14 is sealingly fitted in one end of a cylinder 12, while the other end thereof is closed. A rod 15 is slidably disposed through an opening 14A in the rod guide 14, with one end 15A of the rod 15 being secured to a piston 16 slidingly fitted within the cylinder 12, and the other end 15B thereof being positioned outwardly of the cylinder 12. An annular stopper 17 is press-fitted or otherwise secured to the inner wall of the cylinder 12 to define the extension stroke of the piston 16. The piston 16 divides the interior of the cylinder 12 into chambers C and D.

According to the present invention the rod guide 14 is formed to have a cavity consisting of a cylindrical or a cup-shaped portion 19A and an inwardly divergent cavity portion 19B continuous with the cylindrical portion 19A. A seal 18 is retained in the cylindrical portion 19A of the cavity engaging with the outer periphery of the rod 15 and with the inner periphery of the cylindrical portion 19A or with the bottom surface of the cavity to seal the interior of the cylinder from the outside. As shown in FIG. 3, when the seal 18 is positioned within the divergent cavity portion 19B, an annular gap 20 is formed between the wall of the cavity portion 19B and the outer periphery of the seal 18. The stopper 17 has three cut-out portions or passages 21 (only one of which is shown) in the outer periphery thereof so as to allow fluid communication therethrough. A gas filling opening 22 is formed in the rod guide 14 communicating the cylindrical cavity portion 19A with the outside of the cylinder 12. There is provided a clearance 23 between the rod 15 and the rod guide 14.

In operation to fill gas into the cylinder 12, oil is filled in advance into the cylinder by a predetermined amount leaving a space for filling gas therein. The cylinder 12 is placed in a gas atmosphere maintained at a given pressure. The gas in the atmosphere acts to displace the seal 18 inwardly along the rod 15 so that the annular gap 20 is formed between the seal 18 and the cavity portion 19B. The gas flows into the cylinder 12 through the opening 22, the gap 20 and the passages 21. In this respect, the rod 15 may be moved inwardly so as to carry and move the seal therewith thus providing the gap and, thereafter, the cylinder 12 may be positioned in the gas atmosphere, otherwise the clearance 23 and the opening 22 may be exposed to gas under pressure by utilizing a suitable fitting.

When the gas under pressure is filled in the cylinder, the rod 15 is moved outward (downward in FIGS. 3 and 4) by a small amount so as to carry the seal 18 therewith. Thereby the outer end portion 18A of the seal 18 comes into the cylindrical cavity portion 19A closing the gap 20.

When the gap 20 is closed as shown in FIG. 4, the cylinder device is taken out from the gas atmosphere thus relieving the pressure acting on the exterior of the cylinder 12. This results in a pressure difference between the interior and the exterior of the cylinder 12, which moves the seal 18 outwardly. As a result, the seal 18 is pressed against the bottom surface 19A' of the cylindrical cavity portion 19A as well as the outer periphery of the rod 15 to maintain the interior of the cylinder 12 in fluid tight relation.

As is apparent from the foregoing description, according to the present invention, there are provided a rod guide having a cavity consisting of a cylindrical cavity portion cooperating with a seal in fluid tight relation and an inwardly divergent cavity portion continuous with the cylindrical cavity portion to define a gap between the seal when the seal is displaced inwardly from the cylindrical portion, which gap allows filling of gas into the cylinder. Thus, the present invention can dispense with the complicated operation of welding a plug in gas atmosphere and hence the costly gas filling and welding system. In addition, gas may be filled into the cylinder with ease, and the seal may be displaced in the cylindrical cavity portion to its proper position under gas pressure within the cylinder so as to seal the interior of the cylinder in fluid tight relation, thus presenting a high reliability in preventing leakage of gas or oil.

Further, even if pressure of gas in the cylinder is reduced by some degree during service for a long period of time, gas may be supplied into the cylinder without drilling a hole for filling gas into the cylinder.

What is claimed is:

1. A method for filling gas into a sealed cylinder device of the type including a cylinder having a closed first end, a rod guide disposed in a second end of said cylinder, a rod slidably extending through said rod guide into said cylinder, and an annular seal sealingly surrounding said rod and sealingly contacting said rod guide; said method comprising:

forming said rod guide to have a cavity including a cylindrical portion sealingly receiving said annular seal and an inwardly divergent portion continuous with said cylindrical portion and opening into the interior of said cylinder;

displacing said annular seal inwardly from said cylindrical portion of said cavity to said divergent portion thereof, to thereby form an annular gap between the outer periphery of said annular seal and the wall of said divergent portion;

filling gas under pressure through said annular gap into the interior of said cylinder; and thereafter displacing said rod and thereby said annular seal outwardly until said annular seal contacts the wall of said cylindrical portion of said cavity and closes said annular gap, whereby said annular seal is retained in sealing position within said cylindrical portion by gas pressure within the interior of said cylinder.

2. A method as clamed in claim 1, wherein said annular seal is displaced inwardly by moving said rod inwardly so as to carry said annular seal therewith.

3. A method as claimed in claim 1, wherein said annular seal is displaced inwardly by applying gas under pressure from the exterior of said cylinder device.

4. A method as claimed in claim 1, wherein said step of filling gas under pressure comprises supplying said gas to said annular gap through a clearance formed between said rod guide and said rod.

5. A method as claimed in claim 4, wherein said gas filling step further comprises supplying gas to said annular gap through a filling opening which is separate from said clearance and which is formed in said rod guide from the exterior of the cylinder device to said cavity.

6. A method as clamed in claim 1, further comprising providing a stopper within said cylinder for restricting the inward displacement of said annular seal and for restricting outward movement of a piston secured to the inner end of said rod.

* * * * *